PULSE SEQUENCE TIMER
Original Filed Dec. 16, 1958
2 Sheets-Sheet 1
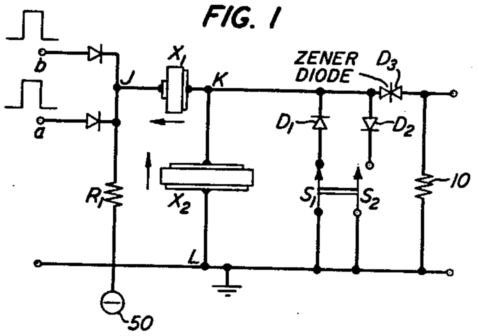
FIG. 2
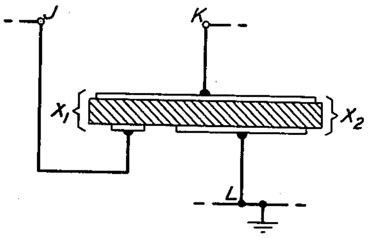
FIG. 3
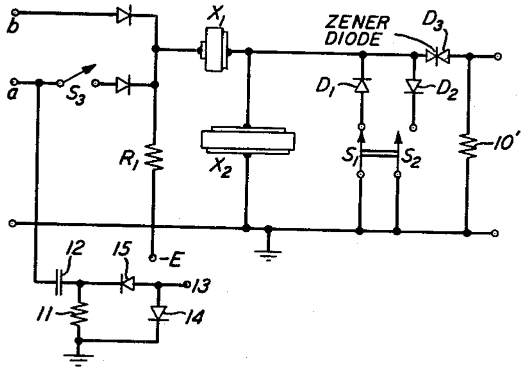
FIG. 6
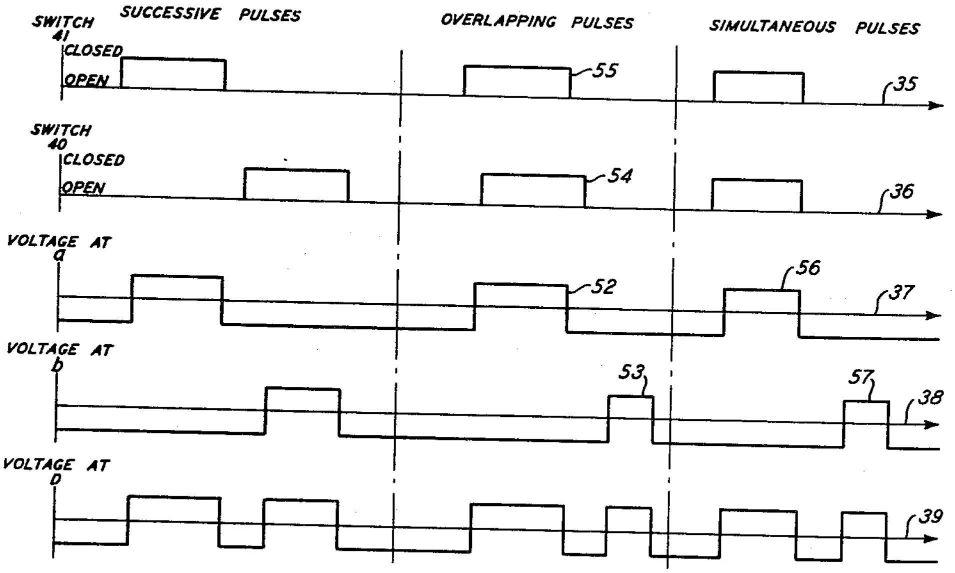
INVENTORS E. E. SCHWENZFEGER
I. M. VOGT
BY
S E Hollander
ATTORNEY July 27, 1965 E. E. SCHWENZFEGER ET AL 3,197,650

PULSE SEQUENCE TIMER

Original Filed Dec. 16, 1958

2 Sheets-Sheet 2

INVENTORS E. E. SCHWENZFEGER
I. M. VOGT

BY S E Hollander

ATTORNEY

United States Patent Office 3,197,650

Patented July 27, 1965

3,197,650

PULSE SEQUENCE TIMER

Edward E. Schwenzfeger, Bayside, N.Y., and Irmfried M. Vogt, East Orange, N.J., assignors to Bell Telephone Laboratories, Incorporated, New York, N.Y., a corporation of New York Original application Dec. 16, 1958, Ser. No. 780,763, now Patent No. 3,126,525, dated Mar. 24, 1964. Divided and this application Nov. 22, 1963, Ser. No. 329,335

4 Claims. (Cl. 307—88)

Figure 4:
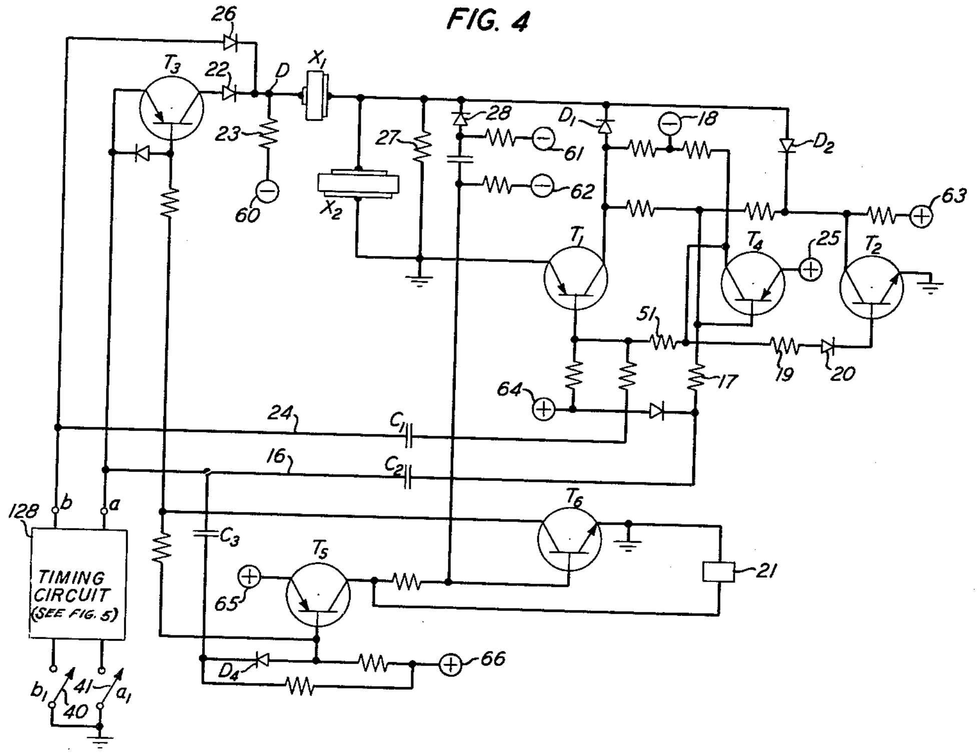

This invention relates to ferroelectric counting circuits and more particularly to a ferroelectric message count-in–count-out circuit for use in teletypewriter or telegraph systems. This is a division of application Serial No. 780,763 filed December 16, 1958, by E. E. Schwenzfeger and I. M. Vogt now Patent No. 3,126,525 issued March 24, 1964.

In certain teletypewriter and telegraph transmission systems the transmitter is conditioned to be operated when the attendant initiates a messages. Assuming that other system factors permit, e.g., the originating station is given permission to transmit by the control station, the speed of transmission will be limited by the speed of the attendant. Since transmission capabilities often far exceed the highest speed attainable by the attendant or typist, a marked inefficiency obtains in realization of potential systems capacity.

In other types of telegraph and teletypewriter systems where a continuous tape exists between the transmitter and the message perforator, serious and costly delays in the operation of the entire transmission system may occur if transmission is interrupted when a taut tape condition is encountered or when the transmitter overtakes the perforator.

Moreover, in those continuous tape systems where a differential in speed between transmitter and perforator exists or where high speed reading devices are utilized it is particularly essential to insure that a complete message is available to the reader before reading begins.

It is, therefore, an object of this invention to prevent the initiation of transmission of a message until at least one complete message is in storage in the tape.

An additional object of this invention is to provide for continuous registration of the aggregate difference between messages transmitted and messages received, thereby indicating the number of complete messages in storage.

A further object of this invention is to provide an improved count-in–count-out circuit employing ferroelectric condensers.

Another object of this invention is to provide for the effective counting of end-of-message signals which arrive simultaneously from the perforator and transmitter.

These and other objects of the invention are achieved in an illustrative embodiment in which a ferroelectric condenser count-in–count-out circuit is utilized in conjunction with an input timing circuit. The timing circuit is arranged to meet those situations in which pulses from the perforator and transmitter, indicating ends of messages, are simultaneously delivered to the count-in–count-out circuit or are concurrently delivered to the count-in–count-out circuit.

The timing circuit includes a pair of "add" and "subtract" input leads respectively connected to the perforator and reader and a pair of "add" and "subtract" output leads respectively connected to two corresponding input leads to the count-in–count-out circuit.

For each message completed by the perforator an end-of-message or "add" signal is forwarded to the "add" input lead of the timing circuit to increase the total count in the counting circuit. As each message is dispatched by the transmitter or reader an end-of-message or "subtract" indication is sent to the timer input to decrease the aggregate count in the counting circuit.

The circuit is arranged to permit the transmitter to operate as soon as one complete message is stored in the tape (and in the count-in–count-out circuit). An output pulse adapted to prevent further energization of the tape transmitter or reader is produced by the counting circuit on the $n$th subtraction or end-of-message pulse from the reader after $n$ messages or "add" pulses have been stored in the tape and counter respectively.

A pair of ferroelectric condensers and two pairs of transistors in the timing circuit are arranged to produce an output on one of the two timer output leads for delivery to the two corresponding input leads of the count-in–count-out circuit. When an "add" pulse is delivered to the input of the timing circuit an "add" output pulse is produced and transmitted to the count-in–count-out circuit. Similarly, a "subtract" pulse delivered to the input of the timing circuit will produce a "subtract" pulse at the output of the timing circuit for transmission to the count-in–count-out circuit.

If, during the continuance of an "add" pulse at the input of the timing circuit, a "subtract" pulse is delivered to the input of the timing circuit, the output of the timing circuit remains unchanged and continues to produce an "add" pulse. During the interval when both input pulses to the timing circuit overlap, a ferroelectric condenser connected to the last input to arrive at the timing circuit is reoriented in polarization. When the "add" pulse at the input to the timing circuit terminates, a "subtract" pulse appears at the output of the timing circuit after a predetermined delay interval and the ferroelectric condenser is switched back to its original polarization. The second output or "subtract" pulse will be delivered at the output of the timing circuit even in those instances where the "subtract" pulse at the input to the timing circuit has terminated before the "add" pulse has terminated. Thus, where one pulse completely overshadows the other by beginning earlier and ending later, the correct sequence of output pulses nevertheless ensues.

In one illustrative embodiment, the first "add" pulse to appear at the input to the count-in–count-out circuit is absorbed without affecting the total count stored, but a transistor switch is operated to indicate a tape-in condition, i.e., a condition in which the tape reader is ordinarily permitted to begin reading.

The purpose of absorbing the first "add" pulse is to permit an output from the count-in–count-out circuit when the $n$th "subtract" pulse is received after $n$ "add" pulses are stored. Unless the first "add" pulse is absorbed, an output will not be obtained from the count-in–count-out circuit until the $(n+1)$th "subtract" pulse is received. This feature will be explained in detail herein.

The basic elements of the count-in–count-out circuit include two ferroelectric condensers, a smaller of which has electrodes having an area A capable of switching a unit charge $q$. The electrodes on the other condenser have an area $n \times A$ and are, therefore, adapted to switch a charge approximating $n \times q$. Under this arrangement the maximum number of end-of-message indications that may be counted is $n$.

For each "add" pulse that is delivered to the count-in–count-out circuit, the smaller condenser is reoriented and switches in series with one unit charge of the large condenser. When the "add" pulse (representing an end-of-message indication from the tape perforator) terminates, the smaller condenser is reoriented to its original polarization and the larger condenser remains unchanged in consequence of a low impedance path established thereacross by transistor switches during the reorientation cycle. This process is repeated each time an end-of-message indication or "add" pulse is received from the perforator.

In subtracting from the number of stored messages, end-of-message signals from the reader or transmitter appear at the "subtract" input terminal to the count-in–count-out circuit as described above in the operation of the timer. When a "subtract" signal arrives at the input to the count-in–count-out circuit, the smaller condenser is switched in orientation but does not switch in series with the larger condenser since additional transistor switches establish a low impedance path across the larger condenser to by-pass any current from the smaller condenser during the input pulse. When the "subtract" pulse terminates, however, the smaller condenser is reoriented to its original polarization over a circuit including the larger condenser thus permitting a unit charge of the larger condenser to be switched back. In this manner the total charge on the larger condenser is reduced by one unit.

A feature of this invention includes apparatus for producing successive output pulses in response to the reception of successive input pulses in the order of the appearance of the input pulses.

Another feature of this invention is a timing circuit including ferroelectric condensers for producing successive output pulses in instances where two input pulses arrive simultaneously.

An additional feature of this invention is a timing circuit including ferroelectric condensers for producing successive output pulses where input pulses arrive concurrently or overlap, the output pulses reflecting the time order of arrival of the input pulses.

A further feature of this invention includes apparatus for producing an output pulse in response to an input pulse where the input pulse terminates before the inception of the output pulse.

Still another feature of this invention is a pair of ferroelectric condensers adapted to serve as memory devices to record the order of arrival of input pulses to a timing circuit.

A further feature of this invention includes circuitry in connection with the memory devices for producing output pulses after the termination of the input pulses, the order of arrival of which is recorded in the memory devices.

Figure 5:
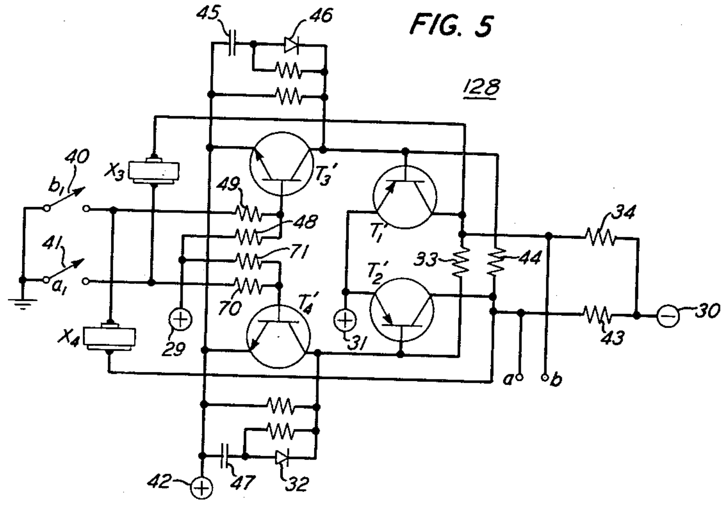

A more complete understanding of the invention will be afforded from an examination of the following specification, appended claims and attached drawing, in which:

FIG. 1 shows a message count-in–count-out circuit employing ferroelectric crystals wherein an output is provided on the $(n+1)$th subtraction after $n$ messages have been stored;

FIG. 2 indicates the manner in which the separate crystals of FIG. 1 may be incorporated in a single crystal;

FIG. 3 shows a message count-in–count-out circuit wherein an output is provided when the $n$th subtraction is made after $n$ messages have been stored;

FIG. 4 indicates a count-in–count-out circuit similar to that of FIG. 3 wherein transistor switches are utilized and a timing circuit is connected at the input;

FIG. 5 is a detailed rendition of the timing circuit shown in outline form in FIG. 4; and FIG. 6 is a graphic representation of the action of the timing circuit of FIG. 5 illustrating the output voltages in the cases of simultaneous, overlapping or successive pulses from the perforator and transmitter.

Referring now to FIG. 1, a counting circuit comprising an integral part of the invention is shown. Condensers X1 and X2 are ferroelectric crystals. The electrodes on crystal X1 have an area A and the electrodes of crystal X2, $n\times A$. It will be assumed that they are adapted to switch a charge $q$ and $n\times q$, respectively. Under this arrangement the maximum number of units or stored messages that may be counted is $n$. "Add" signal are supplied to terminal $a$ and "subtract" signals to terminal $b$. For a detailed description of the manner in which the "add" and "subtract" signals are evolved in the perforator and transmitter, reference may be made to Patent No. 2,575,329 of W. B. Blanton et al., issued on November 21, 1951.

The perforator and reader internal circuitry are omitted from the present disclosure for clarity; reference may be made to Patent No. 2,766,318 of W. M. Bacon et al., issued on October 9, 1956, for a comprehensive description of the perforator and reader equipment.

In the initial state in FIG. 1 crystals X1 and X2 are polarized as indicated by the arrows. The polarization circuit for crystals X1 and X2 extends from ground, crystals X2 and X1 in series, resistance R1, to a source of negative potential 50.

When an end-of-message signal is transmitted to the counting circuit from the perforator (via the timing circuit, not shown) comprising an "add" signal, switch S2 is opened and switch S1 is closed. The positive pulse representing the "add" signal is supplied to input $a$ and crystal X1 switches in series with one unit charge of crystal X2. When the "add" signal pulse terminates, condenser X1 is reoriented to its original polarization over a circuit from ground, switch S1, diode D1, crystal X1, resistance R1 to negative source 50. Thus one unit charge has been added to condenser X2. This process is repeated each time a positive pulse is applied at input terminal $a$.

To subtract from the number of stored messages, end-of-message signals from the reader which appear as positive voltage pulses are applied (via the timer, not shown) at input terminal $b$. Under these conditions switch S2 is closed and switch S1 opened. The circuitry for operation of switches S1 and S2 may be similar to that shown in detail in FIG. 4 for the equivalent function.

When a positive voltage ("subtract" pulse) is applied at input $b$, crystal X1 will switch in series with diode D2. At the conclusion of the positive input pulse at terminal $b$ crystal X1 will be reoriented in polarization by switching back across crystal X2 in series with resistance R1. In this situation the path across diode D2 is blocked in view of the poling of diode D2. Consequently, one unit charge $q$ of condenser X2 is switched back or removed. A similar sequence of events takes place each time a "subtract" pulse appears at terminal $b$.

If at least one unit charge remains stored in crystal X2, the switching voltage across crystal X2 will not exceed a coercive voltage $E_C$ which is insufficient to overcome the breakdown voltage of Zener or breakdown diode D3. However, if no charge remains in crystal X2 and if source 50 has a voltage $-E$, a voltage approximating $(E-E_C)$ will appear across crystal X2. This potential is sufficient to make diode D3 conduct and the negative pulse across output resistance 10 is utilized through conventional circuitry to remove permission for the reader to operate.

The operation of the circuit of FIG. 2 is similar in all respects to that of FIG. 1 traced above, with the exception that in FIG. 2 the electrodes are all mounted on a single crystal unit. Terminals J, K and L represent corresponding connections for substituting the single crystal of FIG. 2 for the two crystals of FIG. 1.

Under the arrangement shown in FIG. 1 with $n$ messages stored in crystal X2, the circuit will produce an output pulse across resistance 10 when the $(n+1)$th "subtract" pulse is applied to input $b$, since the $n$th "subtract" pulse will produce only a voltage equal to $E_C$ across the output resistance 10 in removing the final unit charge.

FIG. 3 indicates a rearrangement of the circuit of FIG. 1 in which an output pulse is produced across resistance 10' on the $n$th subtraction after $n$ messages have been stored. In the arrangement of FIG. 3 the first, "add" pulse applied at terminal $a$ will not be stored in crystal X2 since switch S3 is open. After switch S3 is operated, succeeding pulses at terminal $a$ are stored in crystal X2 in the manner shown for the operation of FIG. 1.

Since the number of messages stored in crystal X2 of FIG. 3 are equal to $n$ messages and a complete message has been perforated before switch S3 is closed, the counting circuit counts $n+1$ messages. The number of pulses that need be applied to terminal $b$ to remove all of the charge from crystal X2 is only $n$. Consequently, an output is produced across resistance 10′ when the $n$th subtraction is made.

In FIG. 3 the first input is absorbed before switch S3 is closed, as explained above. The input pulse appearing at terminal $a$ is differentiated through capacitor 12 and resistance 11 to produce a negative output pulse at terminal 13. This pulse is transferred to appropriate circuitry in the tape reader to establish the "tape-in" condition, i.e., a condition in which the tape reader is permitted to read. Switch S3 may be operated at this time in a manner similar to that shown in detail in FIG. 4. Diodes 14 and 15 permit only the negative differentiated pulse to pass to terminal 13. When switch S3 is closed, succeeding pulses on terminal $a$ switch crystals X1 and X2 in series in the manner described for FIG. 1.

*Counting (addition)*

In FIG. 4 input "add" pulses on terminal $a$ from the perforator are initially connected to the emitter of transistor T3 via the timing circuit 128, described in detail infra, to energize transistor T3. At the same time, the positive "add" pulse is conveyed over conductor 16, capacitor C2 and resistance 17 to the base of transistor T4 turning that transistor off. In doing so, conventional flip-flop circuitry interconnecting transistors T1 and T4 turns transistor T1 on, establishing a low impedance path between ground, the emitter-collector path of transistor T1 and diode D1 to bridge condenser X2.

Since transistor T4 is now in the off or high impedance state, a negative potential approaching that of source 18 appears on the collector electrode of transistor T4 and biases transistor T2 in the off condition over resistor 19 and diode 20.

When the first "add" pulse terminates, transistor T5 is switched "on" by a negative pulse derived by differentiating the input pulse over capacitor C3 in the manner described for FIG. 3. Transistor T6 is switched "on" by the positive pulse appearing at the collector electrode of transistor T5. Utilization circuit 21, which may illustratively comprise a start relay in the reader circuit, is energized over an obvious path to give a "tape-in" condition.

As additional pulses appear at terminal $a$ they are coupled through transistor T3 which is now in the low impedance or conducting condition to switch condenser X1 in series with condenser X2 through diode 22. As each positive "add" pulse terminates, condenser X1 is reoriented through resistance 23 to negative battery in series with diode D1 and transistor T1. This procedure continues each time an input pulse appears at terminal $a$.

*Counting (subtraction)*

When a "subtract" pulse appears at terminal $b$, via timer 128 it is coupled over conductor 24 and capacitor C1 to the base of transistor T1, turning that transistor off, and through conventional flip-flop circuitry, turning transistor T4 on. When transistor T4 conducts, the collector potential thereof approaches the potential of source 25 and the positive potential thus applied to the base of transistor T2, over resistances 51 and 19 and diode 20, drives transistor T2 into the conducting state.

At the same time the positive "subtract" pulse is coupled from terminal $b$ through diode 26 to switch condenser X1 in series with diode D2 and transistor T2 which is now in the low impedance condition.

When the input pulse on terminal $b$ terminates, condenser X1 is reoriented in series with condenser X2 through resistance 23 and negative battery to remove one unit charge from condenser X2. It will be noted that diode D2 is reverse biased during reorientation to prevent transistor T2 from by-passing condenser X2.

Subsequent input pulses on terminal $b$ each removes a unit charge of the remaining charge from condenser X2 until no further charge remains. On the $n$th "subtract" pulse the output voltage of condenser X2 across resistance 27 exceeds the coercive voltage and overcomes Zener or breakdown diode 28 to apply a negative potential to the base of transistor T6 thereby deenergizing transistors T5 and T6. In so doing, utilization circuit 21, shown symbolically, is deenergized to remove the "tape-in" condition.

*Counter input timing circuit*

FIG. 5 indicates a timing circuit suitable for use as the equipment 128 shown in outline form in FIG. 4. The circuitry of FIG. 5 is adapted to meet those situations in which signals arrive on terminals $a1$ and $b1$ from the perforator and reader simultaneously, or overlap. In general, the circuitry of FIG. 5 is adapted to provide an output at the terminals labeled $a$ and $b$ when an input appears at $a1$ or $b1$ respectively.

If an "add" input arrives at $a1$ when there is a "subtract" input present at $b1$, the conditions at terminals $a$ and $b$ are not affected and the input at $a1$ is stored in a ferroelectric crystal. When the input at $b1$ terminates, the output voltage at terminal $b$ is removed and a delay is instituted sufficient to permit switching actions of condensers X1 and X2 of the counter. Subsequently, an output is provided at terminal $a$ for a period adequate to complete the desired switching of condensers X1 and X2.

If an input arrives at $b1$ when there is an input at $a1$ already present, the conditions at $a$ and $b$ remain unchanged and the input at $b1$ is stored in a ferroelectric crystal. When the input pulse at $a1$ terminates, the output voltage at $a$ is removed and a delay is provided sufficient to permit switching actions at crystals X1 and X2 to terminate. Subsequently, an output is provided at terminal $a$ for a period adequate to complete switching of crystals X1 and X2.

If both inputs at terminals $a1$ and $b1$ arrive simultaneously, one input is preferred by a flip-flop circuit and the succeeding action is as described above.

Terminals $a1$ and $b1$ are conditioned to be energized and contacts 41 and 40 operated when end-of-message signals appear at the perforator and reader respectively. A detailed description of circuitry suitable for the operation of contacts 40 and 41 may be found in Patent No. 2,502,654 of G. G. Keyes on April 4, 1950.

*Successive "add" and "subtract" pulses*

In examining the circuit of FIG. 5 it is seen that in the quiescent state transistors T3′ and T4′ are conducting in consequence of positive potential at their base electrodes from source 29.

Assuming that an "add" input pulse is applied by closing switch 41 at terminal $a1$, the ground condition applied to the base of transistor T4′ turns that transistor off. The voltage at the collector of T4′ falls from a potential approaching source 42 to a potential approaching that at source 31 which is designed to be at a lower positive potential than source 42. This negative voltage applied to the base electrode of transistor T2′ drives that transistor into the conducting condition and a pulse is applied to terminal $a$ which approaches the potential of source 31.

It will be noted, however, that transistor T2′ is not instantaneously energized when transistor T4′ is turned off. This follows since capacitor 47 has charged during the "on" time of transistor T4′ to a positive potential approaching that of source 42. Consequently, when transistor T4′ is turned off capacitor 47 maintains the voltage at the base electrode of transistor T2′ positive for a brief interval during which capacitor 47 is permitted to discharge through diode 32 and resistors 33 and 34 to negative supply 30. When capacitor 47 discharges to a level sufficient to permit conduction of transistor T2′ an output pulse is supplied at terminal $a$. After switch 41 opens then transistors T1′ and T2′ are both nonconducting as a result of the positive potential at their base electrodes from the collectors of transistors T3′ and T4′.

This brief delay in the interim between the application of the input pulse at terminal *a1* and the appearance of an output pulse at terminal *a* is graphically illustrated in FIG. 6 by the slight lag between the beginning of the input pulse at terminal *a1* when switch 41 is closed and the voltage output at terminal *a*, shown on lines 35 and 37, respectively.

When the "add" pulse terminates and switch 41 is opened transistor T4′ is again turned on and transistor T2′ turned off.

Assuming that a pulse is now applied at terminal *b1* by closing switch 40, a ground condition is applied to the base of transistor T3′ to drive transistor T3′ into the nonconducting condition. The voltage at the collector of T3′ falls from a potential approaching source 42 to a potential approaching that at source 31. The negative voltage thus applied to the base electrode of transistor T1′ drives that transistor into the conducting condition and the potential at terminal *b* rises from a voltage approximating that of source 30 to a voltage approximating that of source 31.

For reasons similar to those discussed above, transistor T1′ is not instantaneously rendered conducting when transistor T3′ is turned off since capacitor 45 has charged in the interim to a positive potential approaching that of source 42. When transistor T3′ is turned off, capacitor 45 maintains a positive voltage at the base electrode of transistor T1′ during the period in which capacitor 45 discharges through diode 46, resistance 44 and resistance 43 to negative source 30. When capacitor 45 discharges to a sufficient level to permit conduction of transistor T1′, an output pulse is delivered at terminal *b*, as described above. This situation is graphically depicted at lines 36 and 38 of FIG. 6 under the "Successive Pulses" heading.

*Overlapping "add" and "subtract" pulses*

In this instance, it will be assumed that switch 41 closes followed by the closing of switch 40, the opening of switch 41 and the opening of switch 40, as shown at curves 55 and 54 of FIG. 6.

When switch 41 is closed to initiate the operation, transistor T4′ is rendered nonconducting and after a brief interval occasioned by capacitor delay 47, transistor T2′ is energized, as explained above, producing an output pulse at terminal *a* shown at FIG. 6, line 37 as pulse 52.

While transistor T2′ remains energized and switch 41 is closed as an "add" indication from the perforator, an end-of-message pulse arrives from the reader as a "subtract" indication. Switch 40 is closed and transistor T3′ is driven into the nonconducting condition in consequence of the ground potential on the base electrode thereof. At this time no output pulse appears at terminal *b* since transistors T1′ and T2′ are in flip-flop arrangement in which, with transistor T2′ already conducting, transistor T1′ is cut off.

At this time condenser X4 is reoriented in polarity in consequence of the positive potential on terminal *a* from source 31 during the continuance of the output pulse at terminal *a*. Thus condenser X4 switches in orientation from source 31, emitter-collector of transistor T2′ and switch 40 to ground.

When switch 41 is opened at the termination of the "add" pulse at terminal *a1*, transistor T4′ is energized in the low impedance condition and transistor T2′ is rendered nonconducting, in the manner described above. Since at this time transistor T3′ is nonconducting, transistor T1′ is now rendered conducting in view of the negative potential on the base electrode thereof, after, however, the delay period introduced through the discharge of capacitor 45, referred to above.

Following the predetermined delay period, an output pulse appears at terminal *b* approaching the level of source 31, even though switch 40 has already been opened as shown at curves 54 and 53, lines 36 and 38 of FIG. 6.

This output pulse is produced although switch 40 is open since condenser X4 is now gradually switched back from source 29, resistor 48, resistor 49, condenser X4 and resistor 43 to negative source 30.

The impedances of resistors 48, 49 and 43 and the potentials of sources 29 and 30 are arranged as described herein to provide substantially zero or ground potential at the base electrode of transistor T3′ for the interval during which condenser 44 is reoriented. Thus transistor T3′ sees, in effect, a ground condition at the base electrode thereof and drives transistor T1′ into the conducting condition to produce an output at terminal *b* shown at pulse 53, line 38 in FIG. 6. A similar analysis may be made where the "subtract" pulse appears first followed by an overlapping "add" pulse.

If the "subtract" pulse completely overshadows the "add" pulse by starting earlier and ending later, sequential "subtract' and add' pulses in that order are nevertheless produced at terminals *b* and *a*. Thus, upon the closing of switch 40 transistor T3′ will be driven into the nonconducting condition, and transistor T1′ will be rendered conducting to produce an output pulse at terminal *b* after the time delay occasioned by capacitor 45. Subsequently, when switch 41 is closed, transistor T4′ will be rendered nonconducting but transistor T2′ will be prevented from turning on in consequence of the flip-flop feedback connections between transistors T1′ and T2′. Condenser X3 will be reoriented over a circuit from potential source 31, emitter-collector of transistor T1′, condenser X3, switch 41 to ground.

When switch 41 is released, transistor T4′ is rendered conducting but condenser X3 does not shift in polarization in consequence of the continued positive output potential on terminal *b* which is applied to the upper electrode of condenser X3.

When switch 40 is released, transistor T3′ is rendered conducting and transistor T1′ nonconducting to terminate the output pulse at terminal *b*. Condenser X3 now switches back from source 29, resistors 71 and 70, condenser X3, resistor 34 to negative source 30. Transistor T4′ is rendered nonconducting as a result of the simulated ground condition produced thereat. After an appropriate delay introduced by capacitor 47, transistor T2′ will be rendered conducting, as explained above. An output pulse thus appears at terminal *a*.

It will be noted that, although switch 40 is released and switch 41 is also released, the memory inherent in the reorientation of condenser X3 nevertheless produces an output pulse at terminal *a* in consequence of transistor T4′ experiencing what is, in effect, a ground potential at the base electrode thereof in consequence of the gradual reorientation of condenser X3 over the path traced above.

Thus it is seen that if successive pulses are received, the timing circuit operates in the above-described manner to provide successive pulses on terminals *a* and *b* with no participation by condensers X3 and X4. However, when overlapping or overshadowing pulses occur, the first switch to be closed produces the first output pulse, and the second switch to be closed will produce a successive output pulse an appropriate time interval after the termination of the preceding output pulse in consequence of the reorientation of the appropriate crystal and independent of the order of release of switches 40 and 41.

*Simultaneous arival of 'add" and "subtract" pulses*

If both switches 40 and 41 are simultaneously closed to indicate simultaneous arrival of "add" and "subtract" pulses from the perforator and transmitter, respectively, transistors T3′ and T4′ will be rendered nonconducting substantially simultaneously but since transistors T1′ and T2′ are connected in a flip-flop circuit arrangement an astable condition obtains in which transistor T1′ or T2′, but not both, is energized. An output pulse is initiated at terminal *a* or terminal *b* in accordance with the selected transistor of the flip-flop T1′ and T2′. Subsequently, the operation of the circuit is similar to that described above for overlapping pulses, i.e., a pulse is produced at one terminal followed by a brief space and a pulse at the other terminal during the reorientation time of either condenser X3 or X4.

An illustration in which transistor T2' is selected in the astable condition is shown at pulses 56 and 57 of FIG. 6.

Line 39 of FIG. 6 graphically illustrates the inputs at terminal D of FIG. 4 comprising a summation of the pulses shown on lines 37 and 38.

In an illustrative arrangement the potential sources indicated in FIGS. 4 and 5 may take the following values:

| | Volts |
|---|---|
| 18 | −10.5 |
| 25 | +3.0 |
| 29 | +40.0 |
| 30 | −25.0 |
| 31 | +20.0 |
| 42 | +25.0 |
| 60 | −22.5 |
| 61 | −10.5 |
| 62 | −3.0 |
| 63 | +10.5 |
| 64 | +7.5 |
| 65 | +21.0 |
| 66 | +25.5 |

The above embodiments and values are merely exemplary and it is understood that various modifications may be made by those skilled in the art without departing from the spirit and scope of the invention.

What is claimed is:

1. A timing circuit including first and second input terminals, first and second output terminals, first bistable means coupling said first input terminal to said first output terminal, second bistable means coupling said second input terminal to said second output terminal, means for interconnecting said first and second bistable means in flip-flop interrelation, a first ferroelectric capacitor serially connected between said first input terminal and said second output terminal and adapted to switch orientation in response to the appearance of an input pulse at said second input terminal and a succeeding overlapping input pulse at said first input terminal and additionally adapted on the termination of said input pulse at said second input terminal to operate said first bistable means to produce an output pulse at said first output terminal, a second ferroelectric capacitor serially connected between said second input terminal and said first output terminal and adapted to switch in orientation in response to the appearance of an input pulse at said first input terminal and a succeeding overlapping input pulse at said second input terminal and additionally adapted on the termination of said input pulse at said first input terminal to switch back in orientation thereby to energize said second bistable means to produce an output pulse at said second output terminal, said first and second bistable means being respectively operative responsive to the appearance of input pulses on said first and second input terminals to produce corresponding output pulses on said first and second output terminals, and capacitor delay means connected to said first and second bistable means and adapted to delay the appearance of said output pulses for a predetermined period after the appearance of said corresponding input pulses.

2. A pulse sequence timer including first and second input terminals, first and second output terminals, first input bistable means connected to said first input terminal, first output bistable means connected between said first input bistable means and said first output terminal, second input bistable means connected to said second input terminal, second output bistable means connected between said second input bistable means and said second output terminal, a first ferroelectric capacitor serially connected between said first input terminal and said second output terminal, and a second ferroelectric capacitor serially connected between said second input terminal and said first output terminal.

3. A pulse sequence timer including first and second input terminals, first and second output terminals, first input bistable means connected to said first input terminal, first output bistable means serially coupling said first input bistable means to said first output terminal, second input bistable means connected to said second input terminal, second output bistable means serially coupling said second input bistable means to said second output terminal, a first ferroelectric capacitor serially connected between said first input terminal and said second output terminal, a second ferroelectric capacitor serially connected between said second input terminal and said first output terminal, and means for interconnecting said first and said second output bistable means in flip-flop feedback relationship, said first and second output bistable means being responsive to the simultaneous appearance of input pulses at said first and second input terminals to condition only one of said output bistable means to produce an output pulse on the associated output terminal, said ferroelectric capacitor connected to said associated output terminal being responsive to the output pulse thereon to switch in orientation and additionally responsive to the termination of said input pulses to condition said other output bistable means to produce an output pulse.

4. A pulse sequence timer including first and second input terminals, first and second output terminals, first input bistable means connected to said first input terminals, first output bistable means serially connected between said first input bistable means and said first output terminal, second input bistable means connected to said second input terminal, second output bistable means serially connected between said second input bistable means and said second output terminal, a first ferroelectric capacitor serially connected between said first input terminal and said second output terminal and responsive to the appearance of an input pulse at said second input terminal followed by an overlapping input pulse at said first input terminal to switch in orientation and additionally responsive to the termination of both said input pulses to switch back in orientation thereby to condition said first input and output bistable means to produce an output pulse at said first output terminal, a second ferroelectric capacitor serially connected between said second input terminal and said first output terminal, said second ferroelectric capacitor being responsive to the appearance of an input pulse at said first input terminal followed by an overlapping input pulse at said second input terminal to switch in orientation and additionally responsive to the termination of said input pulses to switch back in orientation thereby to condition said second input and output bistable means to produce an output pulse at said second output terminal, means for interconnecting said first output bistable means and said second output bistable means in flip-flop feedback relationship, said first and second output bistable means being responsive to the simultaneous appearance of input pulses at said first and second input terminals to condition only one of said output bistable means to produce an output pulse on the associated output terminal, said ferroelectric capacitor connected to said associated output terminal being responsive to the output pulse thereon to switch in orientation and additionally responsive to the termination of said input pulses to condition said other output bistable means to produce an output pulse, and capacitor delay means connected to said first and second input bistable means and adapted to delay the energization of said first and second output bistable means for a predetermined delay period after the appearance of input pulses at said first and second input terminals.

No references cited.

IRVING L. SRAGOW, *Primary Examiner.*